US00RE44518E

(19) United States
(12) Reissued Patent
MacNeil et al.

(10) Patent Number: US RE44,518 E
(45) Date of Reissued Patent: Oct. 8, 2013

(54) METHOD OF SCARIFYING AN INTERIOR SURFACE OF A PIPELINE

(75) Inventors: Gerard MacNeil, Surrey (CA); David MacNeil, Surrey (CA); Gordon MacNeil, Surrey (CA); Vernon Bose, Langley (CA)

(73) Assignee: Mac & Mac Hydrodemolition Inc., Surrey (CA)

(21) Appl. No.: 11/797,365

(22) Filed: May 2, 2007

Related U.S. Patent Documents

Reissue of:
(64) Patent No.: 6,550,486
Issued: Apr. 22, 2003
Appl. No.: 09/777,668
Filed: Feb. 7, 2001

U.S. Applications:
(63) Continuation-in-part of application No. 09/126,113, filed on Jul. 30, 1998, now Pat. No. 6,206,016.

(51) Int. Cl.
*B08B 3/02* (2006.01)

(52) U.S. Cl.
USPC ..... 134/22.11; 134/22.12

(58) Field of Classification Search
USPC ..... 134/166 R, 169 R, 167 R, 184, 198; 15/3.5; 451/76, 102, 381; 122/395
See application file for complete search history.

(56) References Cited

U.S. PATENT DOCUMENTS 2,017,042 A 10/1935 Dougherty
2,285,157 A * 6/1942 Grayson ..... 451/38

(Continued)

FOREIGN PATENT DOCUMENTS

EP 0365921 5/1990
FR 2499880 8/1982

(Continued)

OTHER PUBLICATIONS

Translation of JP 6-229528, Jobayash et al. Aug, 16, 1994.*

*Primary Examiner* — Nicole Blan

(57) ABSTRACT

[This application discloses an automated apparatus for scarifying the interior surface of a pipe or other similar elongated passageway. The apparatus includes a vehicle that propels itself down the inside of the pipe. A scarifying assembly is removably secured to the vehicle and uses arms to reach the walls of the pipe. At the end of each arm there is a fluid nozzle assembly equipped with fluid nozzles. The fluid nozzle assembly rotates or oscillates to scarify the pipe surface. The arms and fluid nozzle assembly interchange with other such scarifying assemblies depending on the shape or type of pipe and the desired scarifying technique. The apparatus is tethered to a source of fluid under pressure and a power source, both of which are located off-board the apparatus at a remote location. An operator supervises the operation of the apparatus, controlling the speed and direction of travel of the vehicle, the speed and direction of oscillation and rotation of the scarifying assembly, and the fluid pressure delivered by the fluid nozzles.] *A method for scarifying the interior surface of a pipe or other elongated passageway is disclosed. The method includes the steps of a) providing a vehicle having a scarifying assembly, which includes an assembly of nozzles; b) positioning the nozzle assembly so that the nozzles are proximate a first selected region of the interior surface of a pipe; c) rotating or oscillating the nozzle assembly; d) applying pressurized fluid to the nozzles; and e) moving the vehicle and/or the nozzle assembly to scarify a swath of the interior surface of the pipe.*

8 Claims, 9 Drawing Sheets

(56) References Cited

U.S. PATENT DOCUMENTS

| | | | | | |
|---|---|---|---|---|---|
| 2,358,557 | A | * | 9/1944 | Boyd et al. | 451/76 |
| 2,461,517 | A | | 2/1949 | Carnevale | |
| 3,016,201 | A | | 1/1962 | Brogden | |
| 3,052,066 | A | * | 9/1962 | Foster | 451/76 |
| 3,109,262 | A | * | 11/1963 | Weaver et al. | 451/76 |
| 3,137,974 | A | * | 6/1964 | Kirkland | 451/102 |
| 3,151,418 | A | * | 10/1964 | Powell et al. | 451/76 |
| 3,153,510 | A | | 10/1964 | Brannfors et al. | |
| 3,571,985 | A | * | 3/1971 | Hulbert, Jr. | 451/38 |
| 3,747,277 | A | * | 7/1973 | Carpenter et al. | 451/88 |
| 3,833,175 | A | | 9/1974 | Pulk et al. | |
| 3,902,276 | A | * | 9/1975 | Jarvis | 451/76 |
| 4,073,302 | A | | 2/1978 | Jones | |
| 4,106,516 | A | * | 8/1978 | Wiegand | 134/45 |
| 4,107,816 | A | * | 8/1978 | Matthews | 15/320 |
| 4,141,374 | A | * | 2/1979 | McMahan | 134/46 |
| 4,161,956 | A | | 7/1979 | Hadgkiss | |
| 4,180,948 | A | * | 1/1980 | Stoltz | 451/76 |
| 4,181,092 | A | * | 1/1980 | Johnson | 118/72 |
| 4,191,590 | A | * | 3/1980 | Sundheim | 134/21 |
| 4,314,427 | A | * | 2/1982 | Stoltz | 451/76 |
| 4,439,954 | A | * | 4/1984 | Bennett | 451/76 |
| 4,545,156 | A | * | 10/1985 | Hockett | 451/2 |
| 4,557,079 | A | * | 12/1985 | Sheesley | 451/76 |
| 4,563,841 | A | * | 1/1986 | Hart et al. | 451/2 |
| 4,603,661 | A | | 8/1986 | Nelson et al. | |
| 4,615,487 | A | * | 10/1986 | O'Brien et al. | 239/281 |
| 4,690,159 | A | | 9/1987 | Vadakin et al. | |
| 5,004,156 | A | | 4/1991 | Montanier | |
| 5,018,545 | A | | 5/1991 | Wells | |
| 5,020,188 | A | | 6/1991 | Walton | |
| 5,022,927 | A | * | 6/1991 | Seidel | 134/34 |
| 5,052,423 | A | | 10/1991 | Chapman et al. | |
| 5,072,487 | A | | 12/1991 | Walton | |
| 5,081,800 | A | * | 1/1992 | Ruholl | 451/2 |
| 5,113,885 | A | | 5/1992 | Ramsey | |
| 5,116,425 | A | * | 5/1992 | Ruef | 134/17 |
| 5,203,646 | A | | 4/1993 | Landsberger et al. | |
| 5,317,782 | A | | 6/1994 | Matsuura et al. | |
| 5,322,080 | A | | 6/1994 | Rankin | |
| 5,352,298 | A | | 10/1994 | Moulder | |
| 5,518,553 | A | | 5/1996 | Moulder | |
| 5,520,734 | A | | 5/1996 | Taylor et al. | |
| 5,522,677 | A | | 6/1996 | Schlecht | |
| 5,561,883 | A | | 10/1996 | Landry et al. | |
| 5,580,393 | A | * | 12/1996 | Lawther | 134/8 |
| 5,851,580 | A | | 12/1998 | Amberg et al. | |
| 6,039,056 | A | * | 3/2000 | Verbeek | 134/22.18 |
| 6,189,473 | B1 | * | 2/2001 | Appel et al. | 114/222 |
| 6,315,648 | B1 | * | 11/2001 | Neer | 451/92 |

FOREIGN PATENT DOCUMENTS

| | | | |
|---|---|---|---|
| GB | 2252807 | | 8/1992 |
| JP | 62-5009 | * | 1/1987 |
| JP | 3-89986 | | 9/1989 |
| JP | 3-89987 | | 9/1989 |
| JP | 6-7754 | | 1/1994 |
| JP | 6-229528 | * | 8/1994 |
| SU | 379295 | | 7/1973 |
| SU | 597441 | | 2/1978 |
| SU | 749458 | | 7/1980 |
| WO | WO98/07532 | | 2/1998 |

* cited by examiner

METHOD OF SCARIFYING AN INTERIOR SURFACE OF A PIPELINE

Matter enclosed in heavy brackets [ ] appears in the original patent but forms no part of this reissue specification; matter printed in italics indicates the additions made by reissue.

RELATED APPLICATION

This application is a continuation-in-part of U.S. patent application Ser. No. 09/126,113, filed Jul. 30, 1998, now U.S. Pat. No. 6,206,016, the contents of which are incorporated herein by reference.

FIELD OF THE INVENTION

The present invention relates to an apparatus for scarifying the interior surface of a pipe or other similar elongated passageway.

BACKGROUND OF THE INVENTION

Pipes used to carry liquids and gases commonly transport all types of materials including water, natural gas, solid and liquid sewage, as well as various other accumulations from the pipe.

The interior surface of a pipeline carrying solids, liquids and gases generally degrades over time as the pipe walls interact chemically and physically with the substances flowing through them. Over time, these pipes require servicing and cleaning.

In particular, a sewer system's interior walls corrode and deteriorate because corrosive materials contaminate the surface degrading the metal and concrete used to build the sewer. The corrosive material arises from both the sewage and wastewater itself, and also from the digestive by-products of bacteria found in the sewage that proliferate in the anaerobic environment. The corrosion causes the walls of the sewer pipe to physically decay, eventually reducing their overall thickness.

The principal source of corrosion is sulfuric acid, which arises as a product of the materials transported in a sewer pipe and the sewer environment itself. Various metal sulfates found in the sewage quickly convert into hydrogen sulfide by: reducing to sulfide ions in the waste water, combining with hydrogen in the water and outgassing above the liquid as hydrogen sulfide gas. Additional hydrogen sulfide originates from bacteria containing contaminants that accumulate on the relatively rough concrete below the maximum liquid level. Bacteria found in these accumulations thrive in the anaerobic sewer environment producing hydrogen sulfide gas as a respiratory bi-product. Oxygen from the liquid below and oxygen condensing from the water in the air react with the hydrogen sulfide on the pipeline walls creating the highly corrosive sulfuric acid. The sulfuric acid attacks the calcium hydroxide in the concrete sewer walls leaving calcium sulfates, which ultimately crumble and fall off of the interior of the wall substantially reducing its thickness.

The waste water level varies over the course of a 24-hour period. The flow is at its lowest level between 1:00 AM and 6:00 AM in the morning but it rises distinctly in the daytime and the pipe may operate near capacity. Because of the gaseous nature of the hydrogen sulfide, the pipe walls are predominately corroded in the portions of the wall above the minimum liquid level. Portions of:the walls which are always below the water level are not subjected to such high concentrations of hydrogen sulfide gas or sulfuric acid and consequently do not experience the same levels of decay.

Eventually the sewer walls must be restored or they can suffer permanent damage leading to great expense. The restoration process is a two-step operation that consists of first scarifying the interior surface of the pipe and then applying a protective coating over the newly scarified pipe surface. Scarifying involves the removal of all of the contaminants and the outer layer of corrupted concrete from the interior surface of a sewer pipe or other elongated passageway.

Attempting to apply a protective coating without first scarifying the pipe surface is futile because it does not stop the decay that has already began underneath the coating. Furthermore, the protective coating itself does not adhere well to the contaminated surface. Thus, scarifying is an essential element of the restoration process.

As previously mentioned, a sewer system typically operates at high capacity during the day with decreasing flow overnight. In order to restore the sewer pipes without diverting the flow (a costly and sometimes impossible alternative), a bulk of the work must be done at night during the brief period when the flow is at a minimum. As previously outlined, the restoration process involves both scarifying the pipe surface and applying a protective coat. In practice, the rate of restoration is impaired because manual scarification takes a proportionally greater amount of time than does the application of the protective coat.

Consequently, it is an object of this invention to provide a new and improved scarifying [apparatus] *method*. Such [an apparatus] *a method* will improve the rate of scarifying of the pipeline's interior walls making restoration without diversion a cost-effective possibility.

It is another object of this invention to provide a scarifying [apparatus] *method* to automate the process of scarification to ensure that the same intensity of scarification is applied to the entire surface without the quality variation that is inherent in manual execution.

SUMMARY OF THE INVENTION

These and other objects of the invention are provided in a new and improved scarifying [apparatus] *method*. In general, references to pipe include a sewer pipe or other similar elongated passageway. As described in the background, scarifying involves the removal of all contaminants and the outer layer of corrupted concrete from the interior surface of a pipe.

The scarifying apparatus of this invention includes a vehicle that is capable of traversing the interior of a pipe and a scarifying assembly removably secured to the vehicle. As the vehicle moves, the scarifying assembly scarifies a selected region of the interior surface of a pipe.

In general, the scarifying assembly may include a fluid coupler having a flow control valve coupled between a source of pressurized fluid and a fluid nozzle. The fluid nozzle may direct a jet of pressurized fluid against the interior surface of a pipe.

The scarifying assembly may further include an arm mounted at one end to the vehicle chassis, a fluid nozzle assembly rotatably mounted to the arm, and an exchanger coupled between the fluid coupler and the fluid nozzle assembly.

The scarifying assembly arm and/or fluid nozzle assembly may be adjustable so as to position that fluid nozzle assembly in proximity to the interior surface of a pipe. The exchanger may distribute fluid from the fluid coupler to the various components of the fluid nozzle assembly.

The fluid nozzle assembly may further comprise a plurality of branches that may be rotatably attached to the exchanger. The branches may be rotatable about a common axis and may conduct fluid from the exchanger. Each of the branches may be equipped with at least one fluid nozzle. The fluid nozzles may be operative to receive pressurized fluid from the branches and expel it against the interior surface of a pipe.

The scarifying apparatus is adaptable to scarify the interior surface of a pipe in many different fashions. A first scarifying assembly is adjustable so that one of the scarifying assembly arm and/or the fluid nozzle assembly is positionable so as to locate the fluid nozzles adjacent to the interior surface of the pipe and to scarify a longitudinal swath of the interior of a pipe in a direction of travel of the vehicle.

Alternatively, the scarifying assembly arm and/or fluid nozzle assembly may be configured so as to rotate about an axis substantially parallel to the longitudinal axis of the pipe, so that the pressurized fluid expelled from the fluid nozzles impacts an entire circumferential swath of the interior surface of a pipe.

The scarifying assembly arm and/or fluid nozzle assembly may also be positionable so as to locate the nozzles adjacent to a bottom surface of the pipe. The pressurized fluid expelled by the nozzles may then clean a longitudinal swath along the bottom surface of a pipe.

The vehicle may comprise a chassis, a track assembly, a motor and a power coupler. The chassis of the vehicle may be adjustable to accommodate pipes having various shapes and sizes. The chassis also supports the scarifying assembly. The track assembly operates to propel the vehicle along a longitudinal direction of the pipe. A motor may be mounted on the chassis and coupled to the track assembly so as to drive the track assembly. A power coupler may be mounted on the chassis to conduct power from a power source to the vehicle and the scarifying assembly.

The power source may be of any type, but preferably, the power source may be electric or hydraulic. Advantageously, the power source may be located on-board the apparatus or may be at an off-board location remote from the vehicle.

The vehicle may further comprise a mechanical, electric or electromechanical appliance that manages the power coupler and the motor so as to control the speed and direction of motion of the vehicle. The appliance may be manipulated by user input that may be direct or from a remote source.

The vehicle may also be equipped and operated so as to index or advance in steps along a longitudinal direction of the pipe. The vehicle may move forward or reverse in an indexed manner.

The power coupler may be utilized to provide power to an actuator. The actuator may be used to move the scarifying assembly with respect to the vehicle. The scarifying assembly may include a second mechanical, electric, or electromechanical appliance that manages the actuator to control the speed and direction of the scarifying assembly as it moves with respect to the vehicle. Again, the appliance may be manipulated by user input that may be direct or from a remote source. The actuator may move the scarifying assembly in a manner which is fully rotational, oscillatory, or both rotational and oscillatory.

Where the actuator is not powered, the exchanger may use energy from the pressurized fluid to move the scarifying assembly with respect to the vehicle. The apparatus may then include a third mechanical, electric, or electromechanical appliance that manages the exchanger to control the speed and direction of the scarifying assembly as it moves with respect to the vehicle. Again, the appliance may be manipulated by user input that may be direct or from a remote source. The exchanger may move the scarifying assembly in a manner which is fully rotational, oscillatory, or both rotational and oscillatory.

Advantageously, the vehicle may be equipped with guiding bars affixed to the chassis at one end and having wall engaging attachments at the other end. The wall engaging attachments move along the interior surface of the pipe and maintain the orientation of the vehicle along a longitudinal axis of the pipe. Preferably the guiding bars are adjustable so as to extend from the vehicle to the interior surface of the pipe. The guiding bars may be individually adjustable to accommodate pipes having various shapes and sizes.

Further, the vehicle may be equipped with a cab to safely hold a human operator.

In a second aspect of this invention, there is provided [an apparatus] *a method* for spraying the interior surface of a pipe. The apparatus includes a vehicle and a spraying system. The vehicle may be adapted for travel along a longitudinal direction of the interior of the pipe and the spraying system, connected at one end to the vehicle, may move with respect to the vehicle and thereby apply spray to a selected region of the pipe's interior surface as the vehicle travels longitudinally along the inside of the pipe.

DESCRIPTION OF THE PREFERRED EMBODIMENT

Definitions

Figure 1:
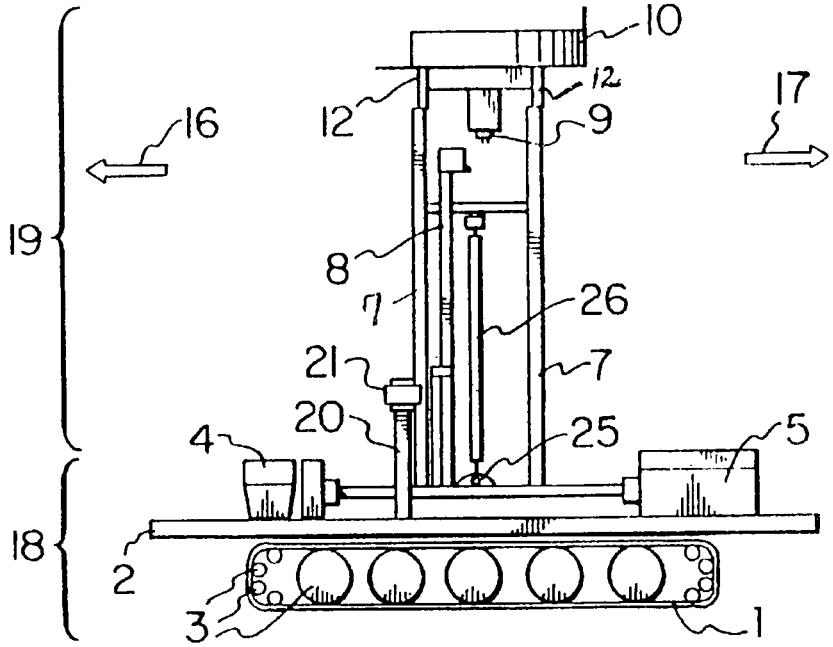
FIG. 1 is a side view of [a first embodiment of the invention depicting] a vehicle and a scarifying assembly consisting of an arm and a fluid nozzle assembly.
Figure 2:
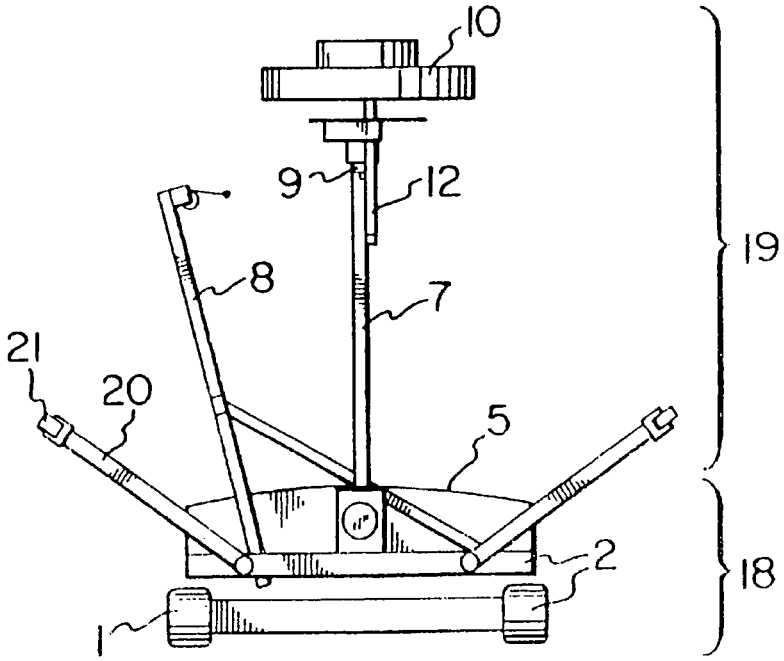
FIG. 2 is a front view of [a first embodiment depicting] an arm in a vertical orientation.
Figure 3:
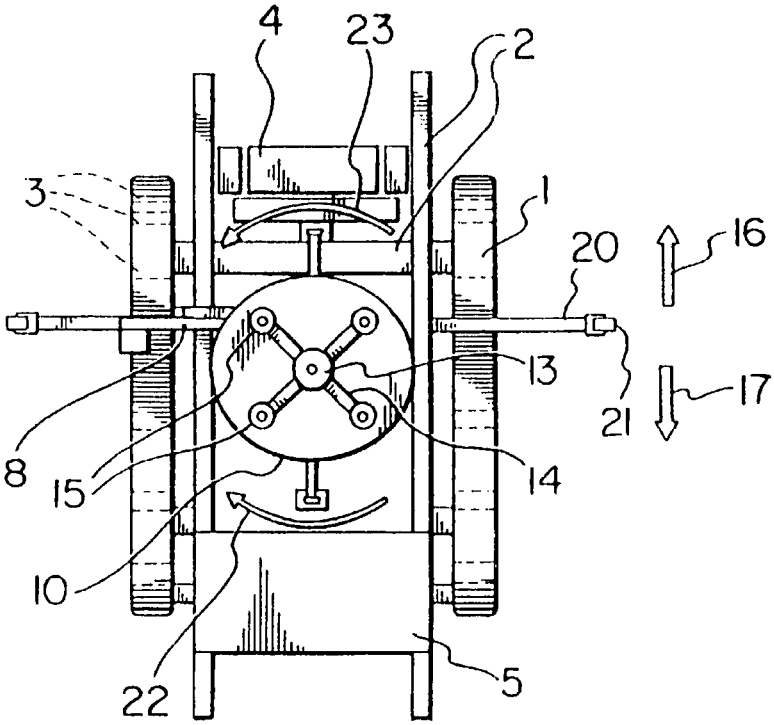
FIG. 3 is a top view of a [first embodiment of the invention depicting a] fluid nozzle assembly.

Pipe: a sewer pipe or other similar elongated passageway.

Scarify/Scarifying: removal of all contaminants and the outer layer of corrupted concrete from the interior surface of a pipe.

First Embodiment

Referring to FIGS. 1 to 4, 8 and 9, a first embodiment of the scarifying [apparatus] *method* is shown comprising a vehicle 18 and a scarifying assembly 19.

The vehicle 18 includes a chassis 2 mounted onto the top of a track assembly 1. The track assembly 1 allows the vehicle 18 to move longitudinally along the bottom floor of a pipe 34 (see FIG. 13). The track assembly 1 is propelled along rollers 3 by a hydraulic motor (not shown) mounted onto the chassis 2. All components mounted onto the chassis 2 are removably secured to the chassis 2 but could be affixed thereto. Although the vehicle 18 has been described with reference to a track assembly 1, any actuator capable of moving the vehicle 18 under power from a motor will suffice.

The hydraulic motor is powered by an external hydraulic reservoir (not shown) coupled to the scarifying apparatus through a hydraulic coupler (not shown) that is also mounted to the chassis 2. It should be noted that, although this embodiment has been described with reference to a hydraulic motor, any power providing means, either external/remote, on-board or any combination thereof, but preferably exhaustless, may be used.

The vehicle 18 is capable of moving in the direction of arrow 16 or 17. An on-board battery 4 powers hydraulic switches (not shown) that control the speed and direction of motion of the vehicle 18. The battery 4 may also be located remotely from the vehicle 18. The motor, hydraulic coupler and hydraulic switches are covered with plate 5 to protect their sensitive parts from debris dislodged during scarification.

In general, the vehicle 18 has a height and width sufficient to allow the vehicle to move along the interior of a pipe 34. The chassis 2 is laterally adjustable so that its width may be adjusted depending on the diameter or width of a pipe 34. Furthermore, the dimensions of the vehicle 18 are sufficiently small to allow the vehicle to pass through access openings to a sewer pipe.

The scarifying apparatus includes a scarifying assembly 19 consisting of an arm 7 and a fluid nozzle assembly 10. The arm 7 is axially extendible by telescoping. Alternatively, the arm 7 can be replaced with one of several arms, each of different length. The replacement arm is selected to position a distal end of the arm 7 proximate an interior surface of a pipe. The arm 7 includes two telescoping pipes in which the upper portion 12 has a smaller diameter than the body of the arm 7 and slides down into the body of the arm 7. A piston 26 controls the extension, and contraction, of the arm 7. The extensibility of the arm 7 permits the arm 7 to be extended or contracted to accommodate pipes of various sizes and shapes.

The arm 7 pivots on hinge 25 in a lateral direction so that it can reach any transverse angle between about 0° and 180°. Consequently, the scarifying assembly 19 can be pivoted to position the fluid nozzle assembly 10 to scarify a desired swath along a length of a pipe 34. A stabilizing bar 8 is used to counteract the weight of the arm 7 as it is extended radially.

The width between the tracks of the track assembly 1 can be adjusted to position the vehicle 18 longitudinally in pipes of various shapes and sizes. The scarifying assembly 19 may be easily removed from the chassis 2 of the vehicle 18 and the chassis 2 collapsed to its minimum width to allow the chassis 2 to pass through a small aperture such as a manhole to enter a pipe 34.

The fluid nozzle assembly 10 is mounted at the distal end of the arm 7. A fluid coupler 9 with a flow control valve (not shown) is coupled to an external source of fluid under pressure (not shown). The pressurized fluid is fed into an exchanger/actuator 13.

Figure 8:
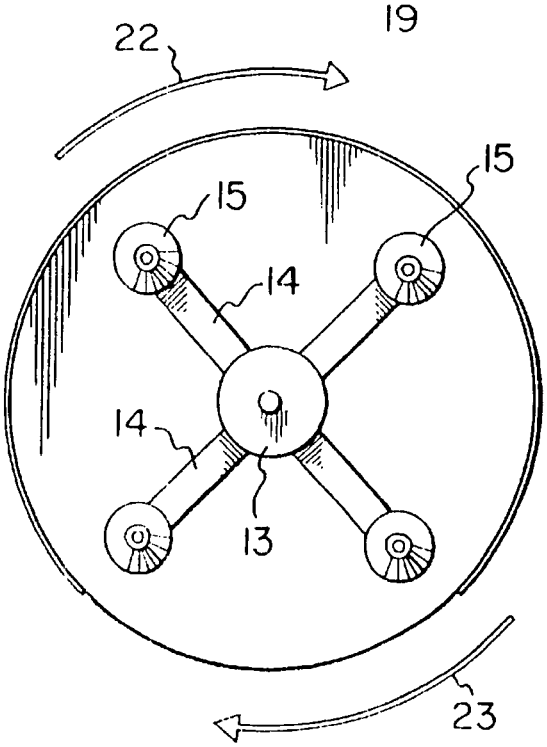
FIG. 8 is a top view of a fluid nozzle assembly employed in a first and third embodiment of the invention.

Referring to FIG. 8, the exchanger/actuator 13 causes the fluid nozzle assembly 10 to rotate or oscillate, and distributes the pressurized fluid to each branch 14 of the fluid nozzle assembly 10. The fluid nozzle assembly 10 rotates in the direction indicated by arrows 22 and 23. The fluid nozzles 15 discharge the pressurized fluid to scarify the interior surface of a pipe. Although this embodiment has been described with reference to one fluid nozzle 15 attached to each branch 14, a plurality of nozzles 15 may be coupled to each branch 14.

When fluid nozzles 15 scarify the interior surface of a pipe, recoil forces may tend to disturb the vehicle trajectory. Accordingly, a plurality of guiding bars 20 may be mounted to the chassis 2 of the vehicle 18. The guide bars 20 are extendible to contact the interior surface of a pipe. The guide bars 20 include wall engaging attachments 21 that contact the interior surface of the pipe and prevent the vehicle 18 from deviating laterally from its path.

Figure 4:
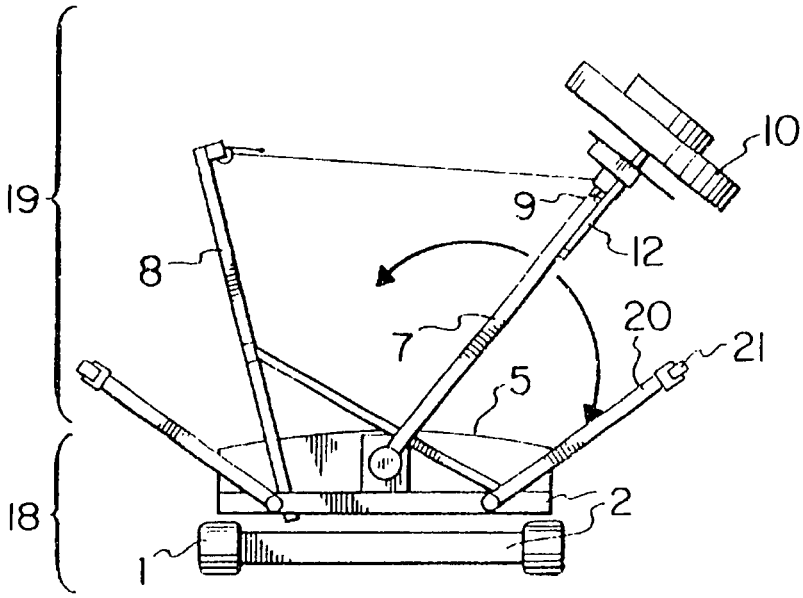
FIG. 4 is a front view of [a first embodiment of the invention depicting] an arm extended at a radial angle to reach an interior surface of a pipe.
Figure 5:
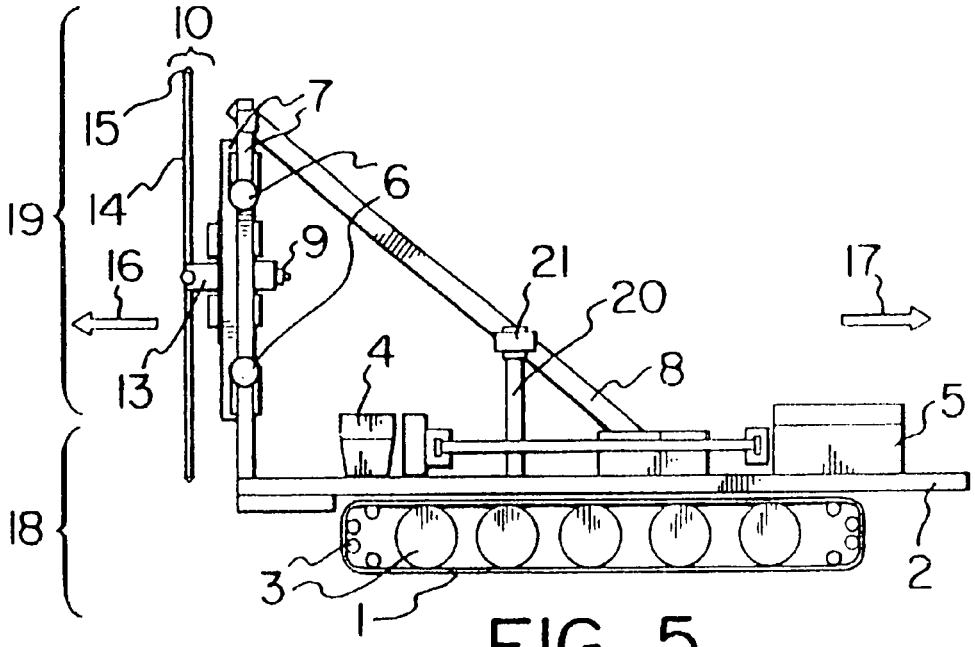
FIG. 5 is a side view of [a second embodiment of the invention depicting] an arm mounted vertically on the front of a vehicle and branches of a fluid nozzle assembly pointing radially at an interior surface of a pipe.
Figure 13:
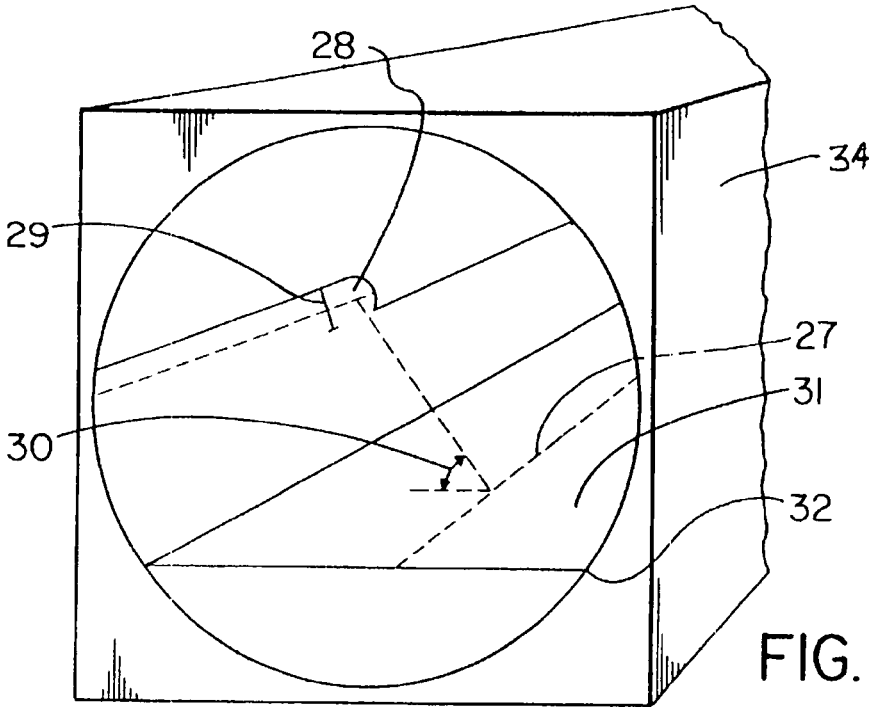
FIG. 13 depicts a swath of an interior surface of a pipe scarified by a first embodiment of the invention.

Referring now to FIGS. 4 and 13, in operation, the vehicle 18 travels along the center of the pipe floor 27, and the scarifying assembly 19 scarifies a swath 28 of the interior surface of the pipe 34. The width 29 of the swath 28 is approximately the same width as the diameter of the fluid nozzle assembly 10 and is centered approximately at the arm angle 30. Fully scarifying the interior surface of the pipe 34 requires that the vehicle 18 make several passes back and forth, changing the arm angle 30 with each pass. The chassis 2 of the vehicle 18 is outfitted with a drawbar (not shown) that holds the hydraulic and pressurized fluid tethers away from the scarifying apparatus to allow the scarifying apparatus to easily travel forward or reverse without running over the tethers.

Additionally, the scarifying apparatus may include a "deadman" switch operative to cut off the high pressure from the moving parts of the scarifying assembly 19. The deadman may be used in both emergency situations and when minor adjustments must be made to the scarifying apparatus during a job.

The scarifying apparatus of this embodiment may be used when the passageways or pipes are not perfectly cylindrical in shape (i.e. they are some other shape such as semicircular in cross section). This embodiment may also be used for a cylindrical pipe when flow diversion is impossible. In this case, a false floor 31 is layered on top of the minimum flow mark 32 and the scarifying is performed above the false floor 31. As most of the corrosion occurs in the area above the minimum flow mark 32, this scarifying method is acceptable for restoration applications.

The Second Embodiment

Referring to FIGS. 5 to 7 and 13, *the apparatus employed by* a second embodiment of the scarifying [apparatus] *method* is shown.

The second embodiment of the scarifying apparatus utilizes the vehicle 18 as described with respect to the first embodiment of the scarifying apparatus.

The scarifying assembly 19 of a second embodiment consists of a vertical arm [7] *57* mounted to the front of the chassis 2, and a fluid nozzle assembly 10. The entire scarifying assembly 19 may be removed from the chassis 2 of the vehicle 18 in order to reduce the size of the scarifying apparatus. This allows the components of the scarifying apparatus to enter a sewer system, pipe or passageway through a small aperture such as a manhole. Similarly, the width of the track assembly 1 can be reduced to assist the chassis 2 to pass through a manhole and access an interior of a pipe 34.

The arm [7] *57* includes adjusters 6 to raise or lower the fluid coupler 9 to align it approximately with the cross-sectional center of the pipe. This alignment ensures the interior walls of the pipe are evenly scarified. The arm [7] *57* is coupled to a stabilizing bar 8 to counteract the weight of the arm [7] *57* and the scarifying assembly 19 in front of the vehicle 18.

Figure 6:
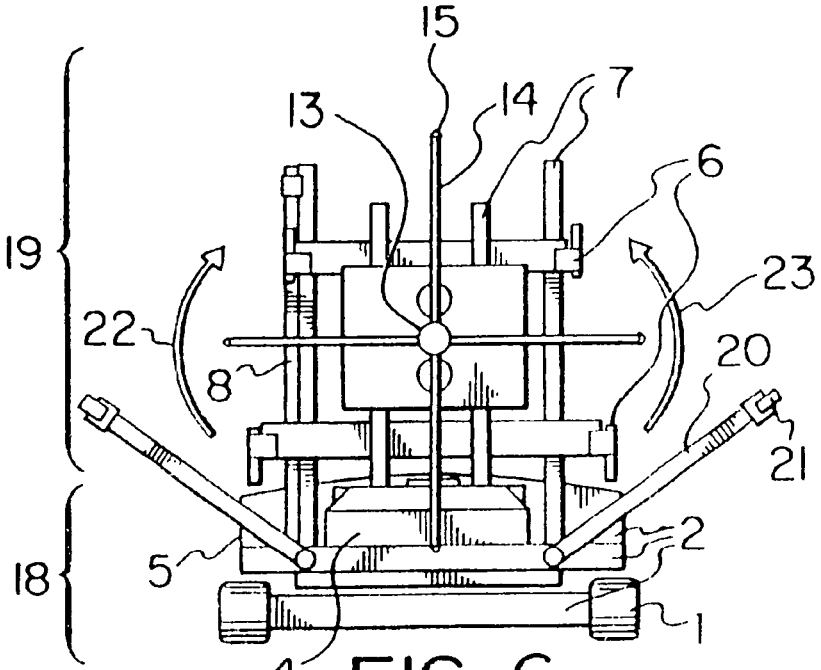
FIG. 6 is a front view of [a second embodiment of the invention depicting] an arm mounted vertically on the front of a vehicle and branches of a fluid nozzle assembly pointing radially at an interior surface of a pipe.
Figure 7:
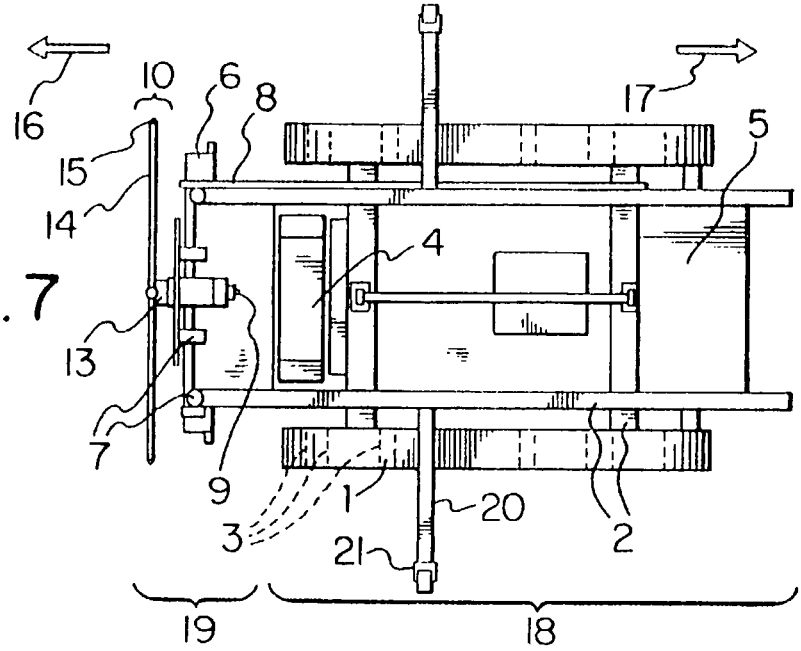
FIG. 7 is a top view of *the apparatus employed by* a second embodiment of the invention.

The fluid nozzle assembly 10 is secured to the arm [7] *57*. The fluid coupler 9 having a flow control valve (not shown) is coupled to an external source of fluid under pressure (not shown). The pressurized fluid is fed into an exchanger/actuator 13. Referring to FIG. 6, the exchanger/actuator 13 causes the fluid nozzle assembly 10 to rotate or oscillate, and distributes the fluid to each branch 14 of the fluid nozzle assembly 10. The fluid nozzle assembly 10 rotates in the direction indicated by arrows 22 and 23. The branches 14 are axially extendible, each of the branches 14 being replaceable with branches of a desired length in order to bring the fluid nozzles 15 (which are mounted on the ends of the branches 14) into proximity with the interior surface of a pipe. Alternatively, the [braches] *branches* 14 can be made to telescope in order to adjust their length. The fluid nozzles 15 discharge fluid to scarify the interior surface of a pipe. Again, there may be a plurality of nozzles 15 mounted onto the end of each branch 14.

In operation, the vehicle 18 travels longitudinally along the center of the pipe floor in a direction indicated by arrows 16 and 17, the scarifying assembly 19 scarifies a transverse circumferential line along the interior surface of the pipe. Unlike the swaths of the first embodiment, the scarifying apparatus of the second embodiment is capable of scarifying the entire interior surface of a pipe 34 in a single pass through the pipe 34. However, due to the significantly larger area being scarified in a single pass, the vehicle 18 travels more slowly to ensure proper scarification.

Alternatively, the vehicle 18 may be equipped and operated so as to index or advance in steps. Utilizing an indexing vehicle 18 allows a first circumferential area to be scarified while the vehicle 18 is stationary. Upon completion of the scarification of the first circumferential area, the vehicle 18 indexes. At this location, a second circumferential area is scarified. The scarified circumferential areas may be overlapping or non-overlapping. The distance of each index or step, is generally less than or equal to the width of the circumferential area scarified while the vehicle 18 is in one position.

As with the first embodiment, the second embodiment also includes a deadman switch (not shown). This apparatus is preferred over the first embodiment when the conduits or pipes are cylindrical in shape and the entire 360° circumference of the pipe is being cleaned.

The Third Embodiment

Figure 10:
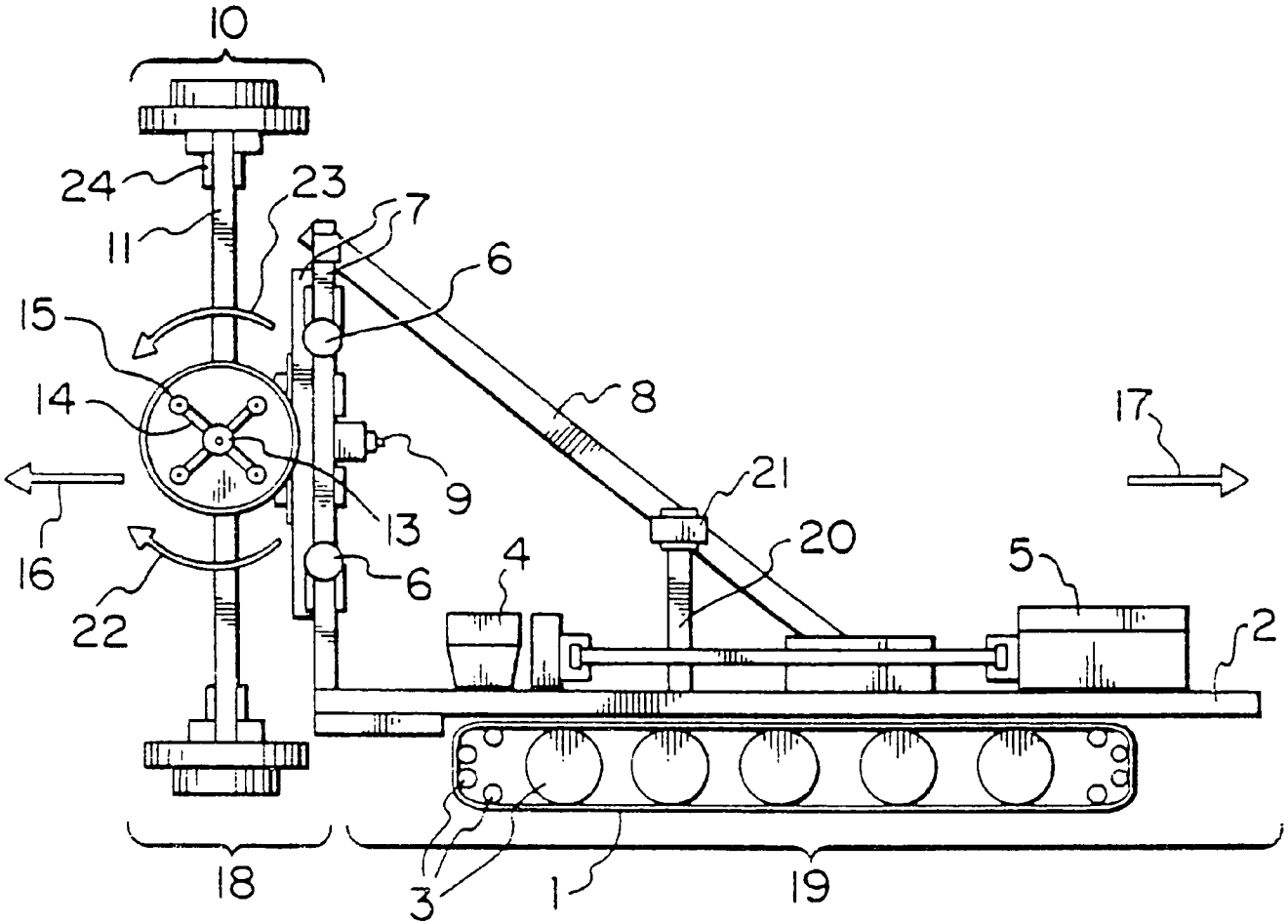
FIG. 10 is a side view of a [third embodiment of the invention depicting a] principal arm and subsidiary arms each having a fluid nozzle assembly.
Figure 11:
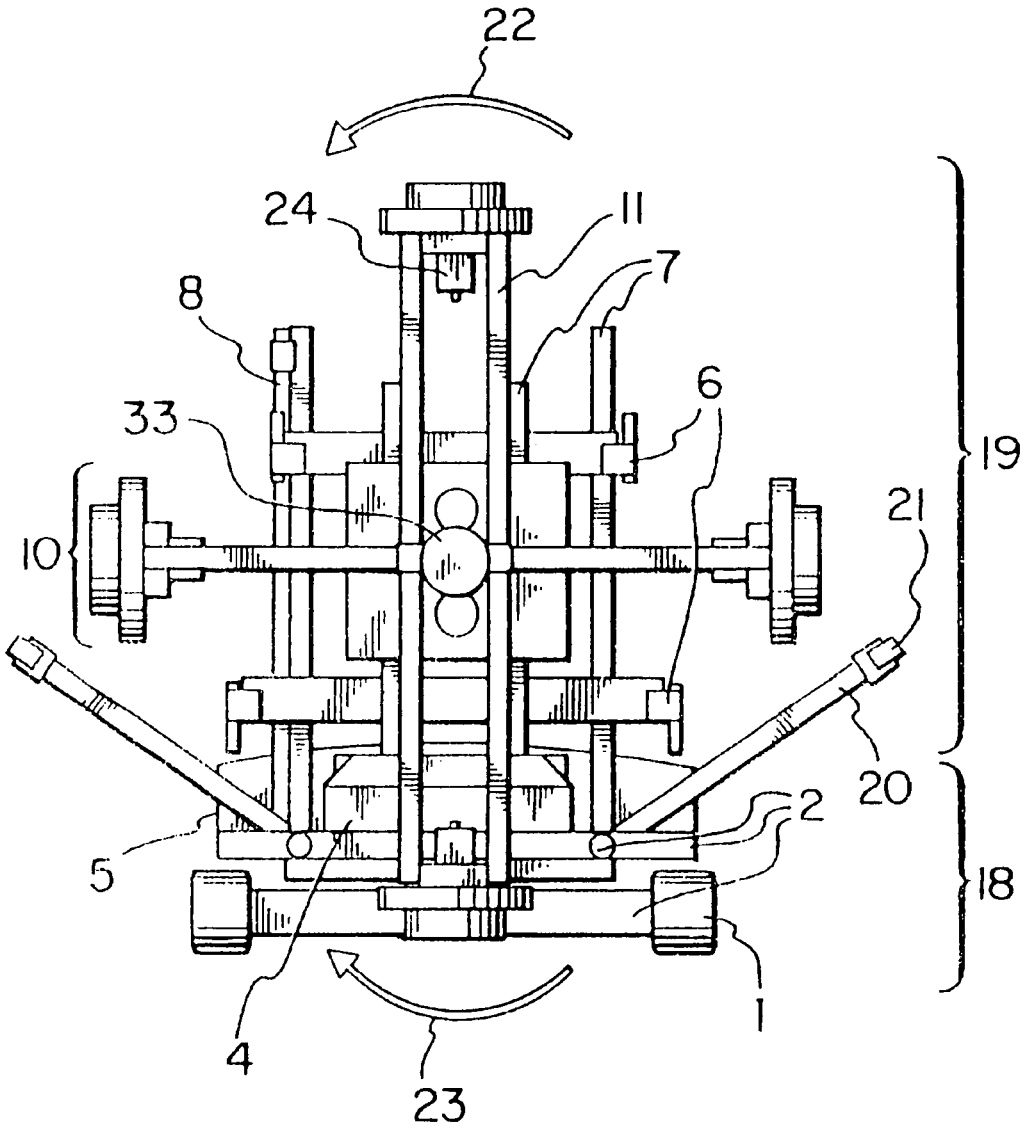
FIG. 11 is a front view of a [third embodiment of the invention depicting a] principal arm and subsidiary arms each having a fluid nozzle assembly.
Figure 12:
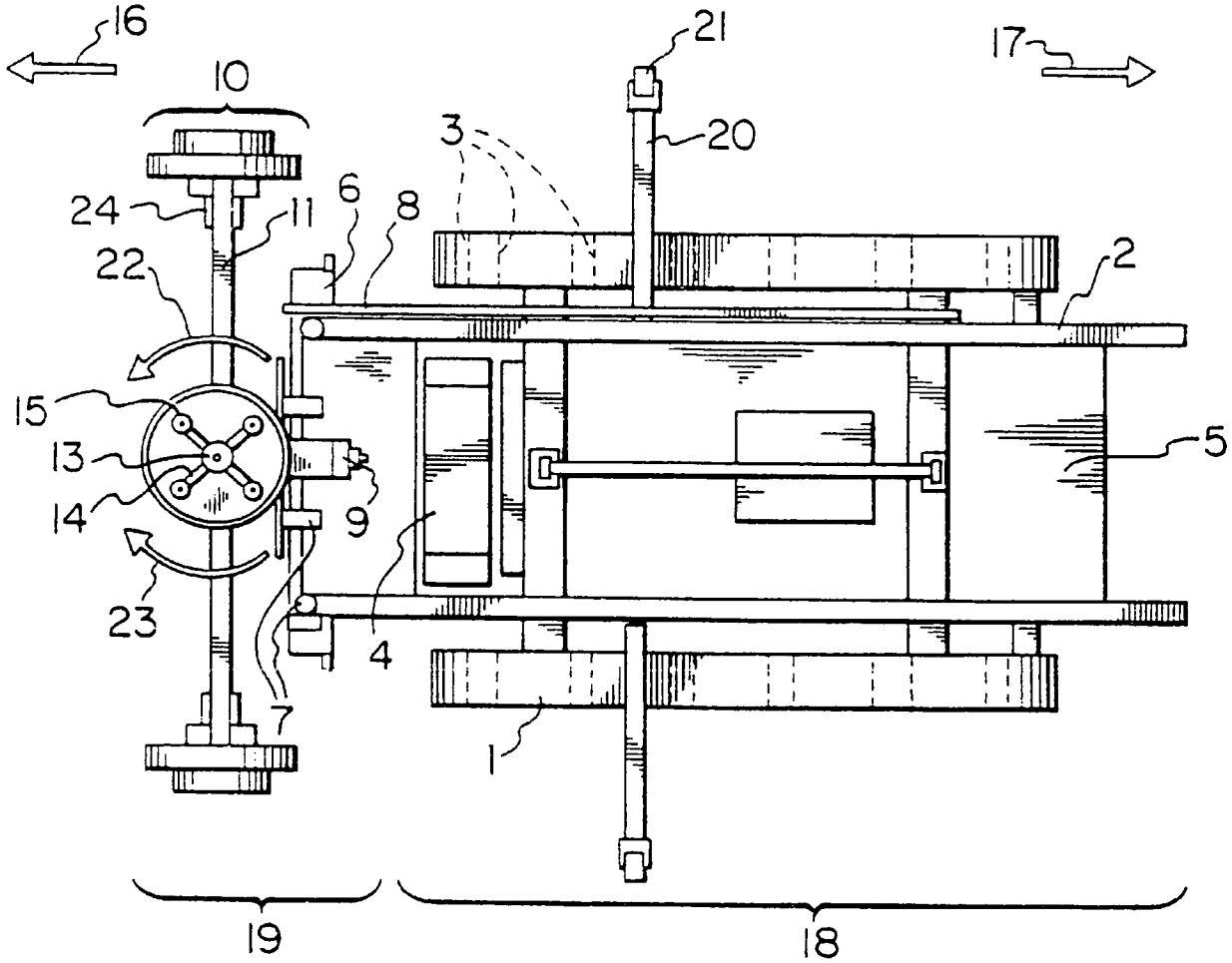
FIG. 12 is a top view of *the apparatus employed by* a third embodiment of the invention.

Referring to FIGS. 10 to 12, a third embodiment having a combination of components from the first and second embodiments is depicted. In essence, the third embodiment utilizes the second embodiment, wherein each fluid nozzle 15 of the second embodiment is replaced by a fluid nozzle assembly 10 of the first embodiment.

The third embodiment includes an exchanger/actuator 33 to simultaneously rotate or oscillate the subsidiary arms 11 and distribute the pressurized fluid. Subsidiary arms 11 are made to telescope and thereby position the fluid nozzle assembly 10 adjacent an interior surface of a pipe 33. Alternatively, the subsidiary arms 11 can be replaced by subsidiary arms of a length sufficient to position the fluid nozzle assembly 10 adjacent the interior surface of a pipe 34. Each fluid nozzle assembly 10 includes a secondary fluid coupler 24, an exchanger/actuator 13, symmetrical branches 14, and fluid nozzles 15.

In operation, the vehicle 18 travels longitudinally along the center of a pipe 34 in a direction indicated by, arrow 16 or 17, while the subsidiary arms 11 rotate or oscillate in the direction of arrow 22 or 23, moving the fluid nozzle assemblies 10 laterally across the inner circumference of the pipe 34. The fluid nozzle assemblies 10 are rotating or oscillating as the subsidiary arms 11 rotate thereby scarifying a circumferential area of the interior of a pipe.

By incorporating the fluid nozzle assembly 10 from the first embodiment, the third embodiment permits the vehicle 18 to travel faster down a pipeline floor while scarifying the interior surface of a pipe 34.

Alternatively, the vehicle 18 may be equipped and operated so as to index or advance in steps. Utilizing a indexing vehicle 18 allows a first circumferential area to be scarified while the vehicle 18 is stationary. Upon completion of the scarification of the first circumferential area, the vehicle indexes. At this location, a second circumferential area is scarified. The scarified circumferential areas may be overlapping or non-overlapping. The distance of each index or step, is generally less than or equal to the width of the circumferential area scarified while the vehicle 18 is in one position. However, as compared with the second embodiment, the index or step of the vehicle 18 of the third embodiment will be larger as the circumferential area scarified in a single pass will be larger.

The Fourth Embodiment

Figure 14:
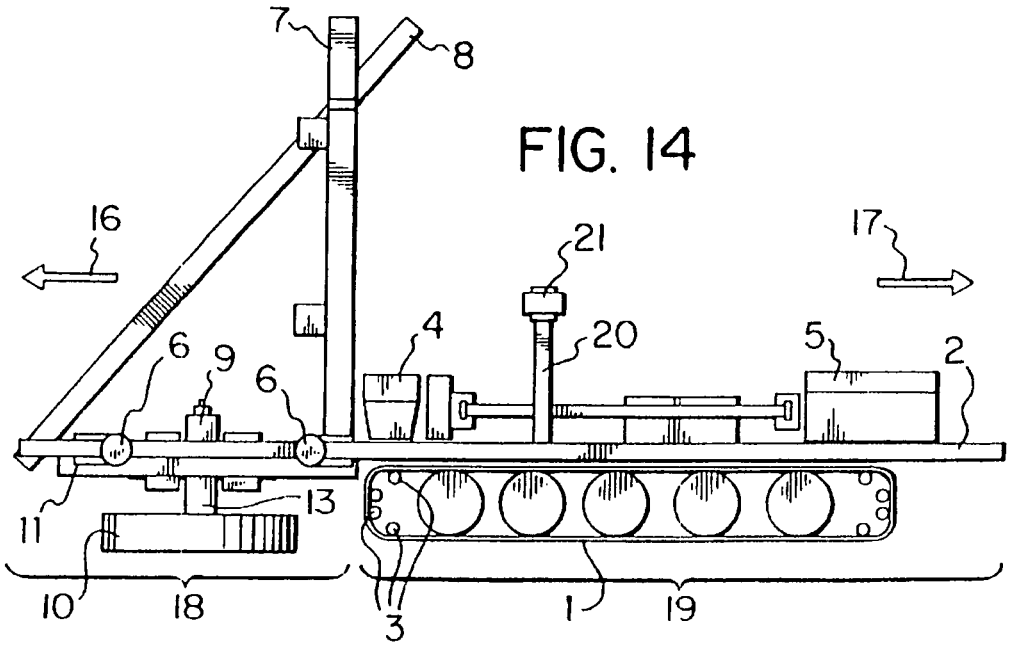
FIG. 14 is a side view of *the apparatus employed by* a fourth embodiment of the invention employed for scarifying a bottom surface of a pipe.
Figure 15:
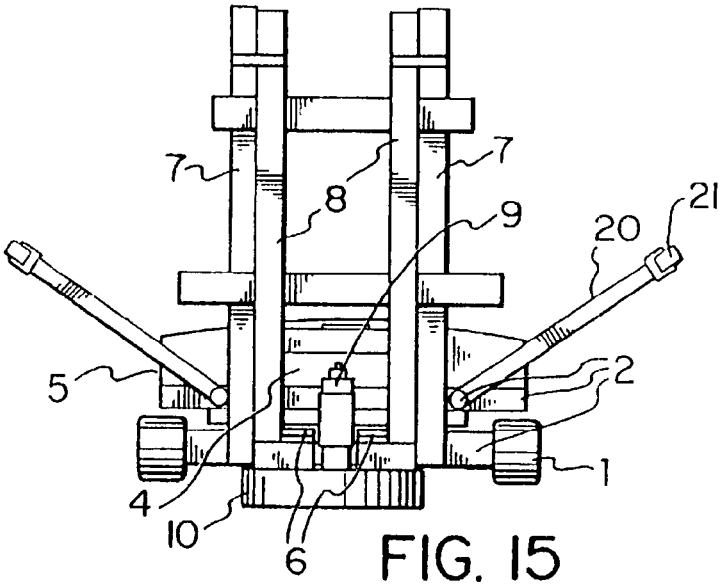
FIG. 15 is a front view of *the apparatus employed by* a fourth embodiment of the invention.
Figure 16:
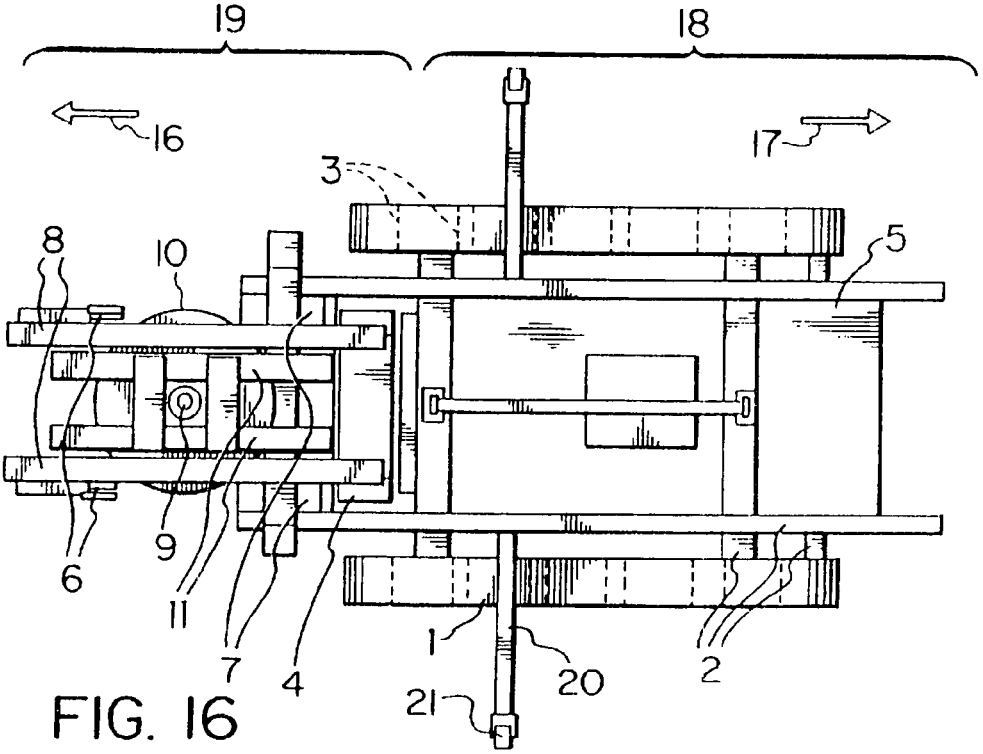
FIG. 16 is a top view of *the apparatus employed by* a fourth embodiment of the invention.

Referring to FIGS. 14 to 16, a fourth embodiment is particularly adapted to scarifying the floor of a pipe is depicted.

Again, this embodiment of the scarifying apparatus utilizes the vehicle 18 as described with respect to the first embodiment of the scarifying apparatus.

Figure 9:
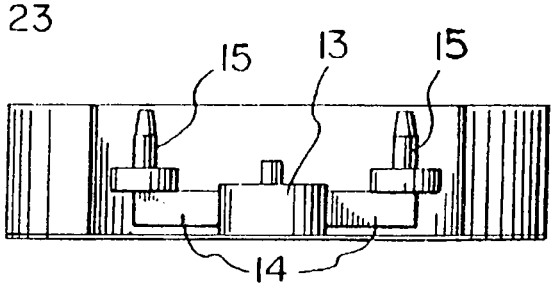
FIG. 9 is a side view of a fluid nozzle assembly employed in a first and third embodiment of the invention.

A scarifying assembly 19 includes an [arm 7] *arms 67* oriented vertically, and a subsidiary arm 11 extending horizontally from [the arm 7] *arms 67*. Adjusters 6 allow [the arm 7] *arms 67* to be adjusted vertically to adjust the height of the subsidiary arm 11. The subsidiary arm 11 supports the fluid nozzle assembly 10, and the fluid coupler 9 with a flow control valve (not shown). The fluid nozzle assembly 10 includes an exchanger/actuator 13, symmetrical branches 14, and fluid nozzles 15 (As shown in FIGS. 8 and 9). A stabilizing bar 8 extends from the front end of the subsidiary arm 11 to the top end of [the arm 7] *arms 67* to stabilize the scarifying apparatus.

In operation, the vehicle 18 travels longitudinally along the center of a pipe in a direction indicated by arrow 16 or 17. The branches 14 of the fluid nozzle assembly 10 rotate or oscillate, scarifying the bottom surface of the pipeline.

The above-described embodiments should be regarded as illustrative rather than restrictive, and it should be appreciated that variations may be made other than those discussed, by workers of ordinary skill in the art without, departing from the scope of the present invention.

What is claimed is:

[1. A method of scarifying an interior surface of a pipe to remove contaminants and corrosion products, comprising the following steps:

a) providing a vehicle having a scarifying assembly coupled to a source of pressurized fluid, said scarifying assembly having a fluid nozzle assembly, said fluid nozzle assembly having a plurality of nozzles mounted at distal ends of respective nozzle branches, said fluid nozzle assembly being capable of one of rotation and oscillation, wherein said scarifying assembly is extendible such that said nozzles can be placed proximate the interior surface of the pipe;

b) positioning said fluid nozzle assembly so that said nozzles are at a desired position proximate a first selected region of the interior surface of the pipe;

c) rotating or oscillating said fluid nozzle assembly;

d) applying pressurized fluid to said nozzles so that they each emit a jet of fluid that scarifies the interior surface of the pipe along the direction of travel of said vehicle; and e) moving one of said vehicle and said fluid nozzle assembly so as to scarify a swath of the interior surface of the pipe.]

[2. The method of claim 1, wherein said nozzle branches are extendible.]

[3. The method of claim 1, wherein said vehicle is moved along the interior of the pipe along a line substantially parallel to a longitudinal axis thereof.]

[4. The method of claim 3, wherein said vehicle is moved through the pipe so as to scarify a first swath of the interior surface of the pipe, wherein said fluid nozzle assembly is then repositioned and said vehicle is moved through the pipe so as to scarify a second swath of the interior surface of the pipe.]

[5. The method of claim 1, wherein said vehicle is moved along the interior of the pipe in a continuous manner.]

[6. The method according to claim 1, wherein said fluid nozzle assembly is operative to scarify a circumferentially continuous region of the interior surface of the pipe, including at least a side and top thereof.]

[7. The method according to claim 1, wherein said fluid nozzle assembly is moved along a path substantially perpendicular to a longitudinal axis of the pipe, so as to scarify a swath of the interior surface of the pipe that is substantially perpendicular to said axis.]

[8. The method according to claim 7, wherein said vehicle is moved along the interior of the pipe along a line substantially parallel to a longitudinal axis thereof in an indexed manner such that said vehicle remains stationary while said fluid nozzle assembly is moved along said substantially perpendicular path.]

[9. The method according to claim 1, wherein a speed of said vehicle, a setting of pressure of the fluid flowing to said nozzles and a rate of rotation or of oscillation of said nozzles is controlled in response to user input, which user input is applied from one of a direct source and a remote source.]

[10. The method according to claim 9, wherein said fluid nozzle assembly is rotated as said vehicle is continuously moved along the interior of the pipe such that a helical swath of the interior surface of the pipe is scarified.]

[11. The method according to claim 1, wherein said fluid nozzle assembly is rotated about an axis substantially parallel to a longitudinal axis of the pipe.]

[12. The method according to claim 1, wherein said fluid nozzle assembly is rotated about an axis substantially perpendicular to a longitudinal axis of the pipe.]

*13. A method of scarifying an interior surface of a pipe to remove contaminants and corrosion products, said method comprising the steps of:*

*(a) providing a vehicle adapted to travel along a longitudinal axis of the pipe;*

*(b) providing a scarifying assembly coupled to the vehicle, wherein said scarifying assembly comprises:*

*i. a nozzle assembly, wherein the nozzle assembly comprises a plurality of nozzle branches and a plurality of nozzles mounted at distal ends of respective nozzle branches; and,*

*ii. an exchanger coupled to the nozzle assembly wherein pressurized fluid provided to the exchanger is distributed to the nozzle branches and is emitted by the nozzles against the interior surface, wherein the exchanger causes at least one of rotation and oscillation of the nozzle assembly, and wherein said scarifying assembly is extendible such that said nozzles can be placed proximate the interior surface of the pipe;*

*(c) positioning the nozzles at a desired position proximate a first selected region of the interior surface of the pipe;*

*(d) providing a pressurized fluid to the exchanger, whereby a jet of fluid is emitted from each nozzle against the interior surface that scarifies the interior surface;*

*(e) rotating or oscillating the nozzle assembly about an axis that is substantially parallel to the longitudinal axis of the pipe; and,*

*(f) propelling the vehicle along the longitudinal axis of the pipe, thereby scarifying a swath on the interior surface along the direction of travel of the vehicle.*

*14. The method of claim 13 wherein the scarifying assembly further comprises an arm; wherein the nozzle assembly is attached to a distal end of the arm; and, wherein Step (c) comprises extending the arm.*

*15. The method of claim 14 wherein Step (e) comprises rotating the arm about the longitudinal axis of the pipe.*

*16. The method of claim 13 wherein Step (c) comprises extending the nozzle branches.*

*17. The method of claim 13 wherein the swath is a circumferentially continuous path substantially perpendicular to the longitudinal axis of the pipe.*

*18. The method of claim 17 further comprising:*

*(g) propelling the vehicle at Step (f) an indexed distance; and,*

*(h) performing Step (e),*

*whereby the circumferentially continuous path is produced.*

*19. The method of claim 13 wherein the nozzle branches extend radially outward from the exchanger in a plane transverse to the longitudinal axis of the pipe.*

*20. A method of scarifying an interior surface of a pipe to remove contaminants and corrosion products, said method comprising the steps of:*

*(a) providing a vehicle adapted to travel along a longitudinal axis of the pipe;*

*(b) providing a scarifying assembly coupled to the vehicle, wherein said scarifying assembly comprises:*

*i. a nozzle assembly, wherein the nozzle assembly comprises a plurality of nozzle branches and a plurality of nozzles mounted at distal ends of respective nozzle branches; and,*

*ii. an exchanger coupled to the nozzle assembly wherein pressurized fluid provided to the exchanger is distributed to the nozzle branches and is emitted by the nozzles against the interior surface;*

*iii. an arm, wherein the nozzle assembly is attached to a distal end of the arm, wherein said scarifying assembly is extendible such that said nozzles can be placed proximate the interior surface;*

*(c) positioning the nozzles at a desired position proximate a first selected region of the interior surface by extending the arm;*

(*d*) *providing a pressurized fluid to the exchanger, whereby a jet of fluid is emitted from each nozzle against the interior surface that scarifies the interior surface;*

(*e*) *rotating or oscillating the nozzle assembly about an axis that is substantially parallel to the longitudinal axis of the pipe by rotating the arm about the longitudinal axis of the pipe; and,*

(*f*) *propelling the vehicle along the longitudinal axis of the pipe, thereby scarifying a swath on the interior surface along the direction of travel of the vehicle.*

* * * * *